Dec. 2, 1930.   F. SCHIELE   1,783,628
CUT-OUT VALVE
Filed Nov. 19, 1928
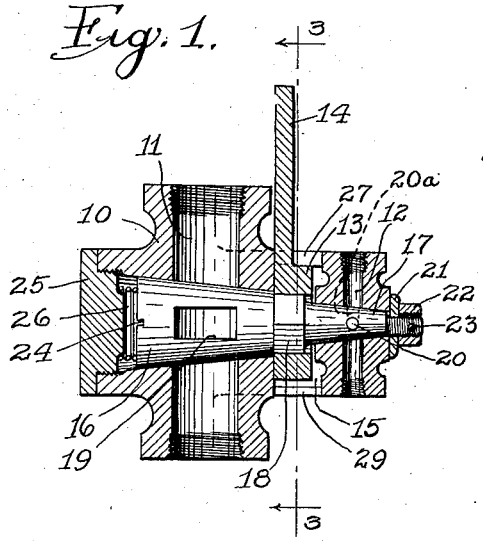
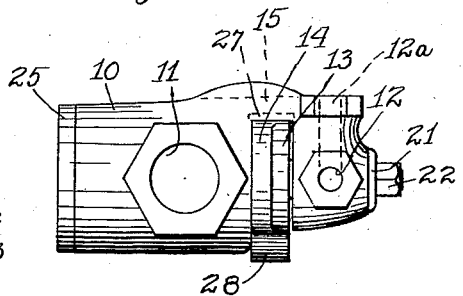
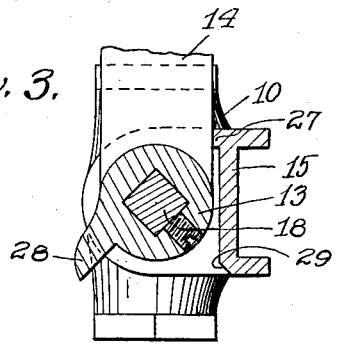
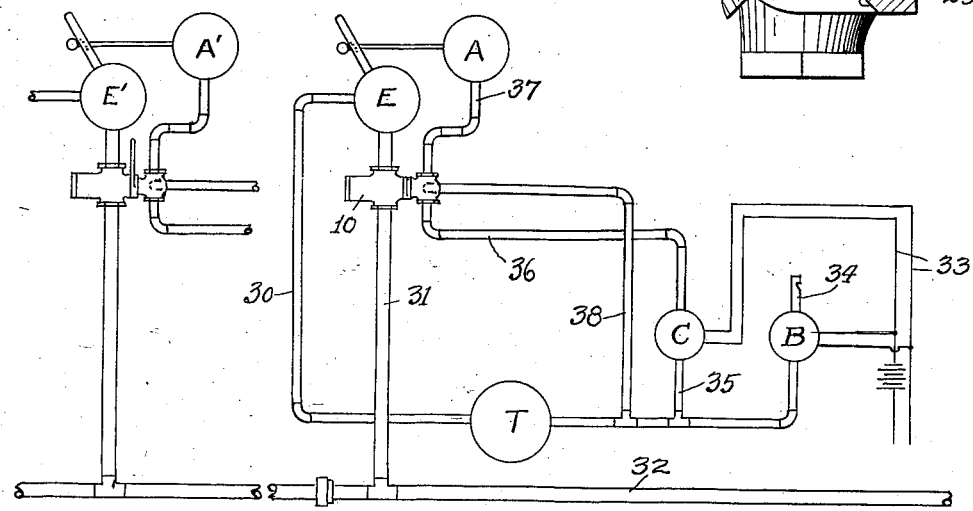
INVENTOR.
F. FREDERICK SCHIELE
BY Albert C. Bell
ATTORNEY.

Patented Dec. 2, 1930

1,783,628

UNITED STATES PATENT OFFICE

FREDERICK SCHIELE, OF NILES, MICHIGAN

CUT-OUT VALVE

Application filed November 19, 1928. Serial No. 320,300.

My invention relates to an improved construction of cut out valve for simultaneously controlling the flow of air or other gases in two separate pipe lines, and my improved construction is adapted for use particularly in connection with control or safety systems employed in connection with the air brake operation of railway cars. For the particular purpose referred to, it is important that control by the operator or engineer of the air line shall be possible of interruption, at the same time that changed conditions of air connections separate from the air line, are established as a part of the control system. In the past, it has been proposed to accomplish this result by employing two separate valves, having their valve members connected with a single operating handle so that operation of the handle will simultaneously operate the two valves. This construction has been found to be unreliable, on account first, of imperfectly fitted connections resulting in a failure to maintain the two valve members in their proper relative position, as a result of which moving one of the valve members to its closed position for example, fails under the conditions referred to, to move the other valve member completely to its alternate position, thus failing to secure the desired cooperative action between the two valve members; and secondly, the undesirable conditions referred to, result in many cases from wear of the connections of the valve members with the operating handle. To avoid the difficulties referred to, I form the two valves in a unitary structure which maintains the valve passageways positively in desired relation to each other, and to control fluid flow through these passageways, I employ a single integral valve member fitting corresponding bores or seats through both of the passageways, so that it is impossible to displace the port or ports in the valve portion controlling one passageway, from proper angular relation with the port or ports in the other valve portion controlling the other passageway, regardless of the fit of the handle and regardless of how the handle may be worn in use.

My invention will best be understood by reference to the accompanying drawings showing a preferred embodiment thereof, in which Fig. 1 is a vertical, longitudinal, central sectional view through my valve construction, Fig. 2 is a plan view of the construction shown in Fig. 1, Fig. 3 is a sectional view of the construction shown in Fig. 1 taken along the line 3—3, and Fig. 4 is a diagrammatic view illustrating one purpose for which my valve construction may be used.

Similar numerals refer to similar parts throughout the several views.

As shown in Figs. 1, 2 and 3 my valve construction consists of a body portion 10, which is preferably a single metal casting, provided with two passageways 11 and 12 for fluid flow, which passageways extend through the body portion in parallel relation, and are provided at their ends with threads for receiving pipes to be connected with the valve construction. The parts or walls of the body portion immediately surrounding the passageways 11 and 12 are separated from each other to provide a clearance space for receiving the hub portion 13 of an operating handle 14, and to permanently and rigidly connect these parts of the housing, I provide a ribbed bridge portion 15 as an integral part of the housing 10, which extends around said clearance space.

The passageways 11 and 12 are controlled by a single integral valve member of the plug type, having tapered portions 16 and 17, preferably progressively tapered in the same direction, in correspondingly tapered seats or bores extending across the passageways 11 and 12, the tapered portion 17 at its larger end being of smaller diameter than the smaller diameter of the tapered portion 16, so that the valve member may also have a flat sided portion 18 between the tapered portions and in line with the clearance space provided for the hub 13. The flat sided portion 18 may conveniently be of square cross section, and the hub 13 is provided with an aperture of similar shape and size so that in placing the valve member in the housing 10, its smaller tapered portion 17 will readily pass through the aperture in the hub 13, to mount the handle 14 on the valve member. The clearance space in the housing 10 for the hub 13, is provided with parallel walls perpendicular to the axis of the valve member, which are separated a slightly greater distance than the length of the hub member axially of the valve member, and in this manner the handle 14 is kept in place on the valve member, so that rotating the handle rotates the valve member. The tapered portion 16 is provided with a port 19 so extending through the valve member that when the port extends vertically, the passageway 11 is uninterrupted and fluid may flow freely through the passageway and when the valve member is turned through an angle of substantially 90°, the port 19 assumes a horizontal position completely interrupting flow through the passageway 11. The tapered portion 17 is similarly provided with a through port 20 establishing free fluid flow through the passageway 12 at the same time that the port 19 establishes free flow through the passageway 11, and proportioned so that when the valve member is in a position interrupting flow through the passageway 11, flow through the passageway 12 would be interrupted by the tapered portion 17, if the port 20 were the only port in the tapered portion 17, and if the passageway 12 were the only passageway controlled by the portion 17. The port 20, however, has communicating with it, a branch port of substantially the same cross section, as indicated at 20a, which extends outwardly in but one direction from the port 20. As indicated in Fig. 2, the housing 10 is provided with a cross or branch passageway 12a, extending from the outer surface of the housing and opening into the passageway 12 in line with the axis of the valve member, the outer end of the passageway 12a being threaded to receive a suitable connecting pipe, as indicated for the passageway 12 in Fig. 1. As a result of the construction described for the tapered portion 17, with the valve member in the position indicated in Fig. 1, flow through the lower part of the passageway 12 is interrupted, but at the same time flow is permitted through the upper part of the passageway 12 and through the passageway 12a by the ports 20 and 20a. When the handle 14 is moved to a position to establish free flow through the passageway 11, the port 20 establishes free flow through the passageway 12 and flow through the passageway 12a is interrupted by the tapered portion 17.

The valve member is provided on its smaller end, with a washer 21 which is held in place by a nut 22 and by a pin 23 extending through the nut and the threaded end of the valve member. The larger end of the valve member is provided with a slot 24 for conveniently grinding the valve member to a true fit in its seats when desired. The bore for the valve member is extended beyond the larger end of the latter, and the end of the bore is closed by a threaded plug 25, between the inner face of which and the larger end of the valve member, a spring 26 is disposed to hold the valve member snugly against its seats at all times.

As pointed out, to change the flow relations controlled by the valve construction from one condition to the other, the handle 14 is turned through substantially 90° and I find it convenient to limit the movement of the handle in either direction by providing a lug 27 extending towards the handle, from the upper edge of the bridge portion 15 so that the edge of the handle engages the lug when flow through the passageway 11 is interrupted, and the hub 13 of the handle is provided with a projecting lug 28 engaging the lower edge of the bridge member 15 at 29, when the handle is turned to establish free flow through the passageway 11.

In Fig. 4, I illustrate diagrammatically the application of my valve construction above described, to an automatic control system for controlling the operation of railway trains. In this connection, my valve construction is installed on the locomotives as a part of the control apparatus with which they are equipped, to give the leading locomotive control of the braking system of the train, and to deprive the trailing locomotive for the time, of such control, where two locomotives are used on the same train. Two engineers' air valves E and E' are shown as part of the equipment of the two locomotives, which have similar connections and are similarly controlled, so that such connections are illustrated only for the engineer's valve E. The valve E is supplied with air under pressure by pipe 30 from the air tank T of the locomotive, and this valve through its operation controls the air pressure in pipe 31 communicating with the train pipe 32 in the usual manner. My cut out valve construction is shown diagrammatically at 10 and may either permit free flow through the pipe 31, under control of the valve E, or prevent flow through the valve 10 and the pipe 31 regardless of the position of the valve E, as desired. The control system diagrammatically illustrated, is of the type in which any suitable actuating devices along the right of way, cause current impulses to flow at desired times through wires 33 to actuate control valves B and C, one of which may operate an audible signal, for example a whistle 34, and the other of which may supply air under pressure from the tank 10 through pipe 35, to an actuator mechanism A for operating the engineers' valve E. Where two locomotives are used on a train, if the valve E is on the trailing locomotive, it is desirable that the actuator mechanism A be supplied with air directly from the tank T, when the valve E is disabled, but that when said locomotive is the leading locomotive or is used alone, the control of the actuator mechanism A be by the control valve C, that direct communication between the tank T and the actuator mechanism A be interrupted, and that the valve E shall have full control of the braking system. To meet these requirements, the valve C is connected by pipe 36 with one end, for example the lower end, of the passageway 12, the upper end of which is connected by pipe 37 with the actuator mechanism A, and the passageway 12a is connected by pipe 38 directly with the tank T. As a result of the connections described, when the cut out valve mechanism 10 is in a position interrupting flow through the pipe 31, the smaller tapered portion 17, by its ports 20 and 20a, establishes communication directly between the pipes 37 and 38, and prevents air flow through the pipe 36 regardless of the position of the control valve C; also, when the valve mechanism 10 is in a position permitting free flow through the pipe 31, communication is established between the pipes 36 and 37 and flow through the pipe 38 is prevented. For the latter condition of the valve 10, the actuator mechanism A is controlled to in turn control the operation of the engineer's valve E, by the control valve C. The control system described does not constitute a part of my present invention and is not therefore shown in all of its detail, as it is well known in the art and is presented diagrammatically to illustrate one use of my cut out valve construction. It will be understood that the other engineer's valve E' is connected and operated in the same manner described for the valve E. It will also be understood that my valve construction may be effectively used for any other purpose where it is desired to simultaneously control fluid flow through separate paths, and that the ports of the two portions of the valve member and the passageways controlled by the same may have any desired relation to meet the requirements of any particular case.

While I have shown my invention in the particular embodiment above described, it will be understood that I do not limit myself to this exact construction as I may employ equivalents known to the art at the time of the filing of this application without departing from the scope of the appended claims.

What I claim is:

1. In a valve construction, the combination of a cast metal integral housing having two through passageways side by side for fluid flow, a tapered integral valve member crossing said passageways and having ports opening and closing said passageways by turning movement of said valve member, and a handle carried by said valve member for turning it, said passageways having separated adjacent walls in substantially parallel relation, said valve member between said walls having a flat sided conformation, and said handle having a hub portion fitting loosely between said adjacent walls and having an aperture fitting the flat sided portion of said valve member.

2. In a valve construction, the combination of a cast metal integral housing having two through passageways side by side for fluid flow, a tapered integral valve member crossing said passageways and having ports opening and closing said passageways by turning movement of said valve member, and a handle carried by said valve member for turning it, said passageways having separated adjacent walls in substantially parallel relation, said valve member between said walls having a flat sided conformation, and said handle having a hub portion fitting loosely between said adjacent walls and having an aperture fitting the flat sided portion of said valve member, the taper of said valve member being progressively in the same direction, the flat sided portion of said valve member being at least as small as the smaller end of the larger diameter ported portion of said valve member, and the larger end of the smaller diameter ported portion of said valve member being at least as small as its flat sided portion, whereby in assembling the valve construction the valve member may be passed longitudinally into its receiving bores through the hub portion of the handle.

In witness whereof, I hereunto subscribe my name this 12th day of November, A. D. 1928.

FREDERICK SCHIELE.